United States Patent [15] 3,684,770
Meisert et al. [45] Aug. 15, 1972

[54] SEGMENTED POLYURETHANE ELASTOMERS BASED ON POLYETHER AND POLYESTER DIOLS

[72] Inventors: Ernst Meisert, Leverkusen; Albert Awater, Cologne-Muelheim; Cornelius Muhlhausen, Leverkusen; Uwe Jens Döbereiner, Opladen, all of Germany

[73] Assignee: Farbenfabriken Bayer Aktiengesellschaft, Leverkusen, Germany

[22] Filed: July 30, 1970

[21] Appl. No.: 59,666

[30] Foreign Application Priority Data

May 7, 1969 Germany..........P 19 40 181.1

[52] U.S. Cl. .......260/75 NP, 8/115.6, 260/77.5 AM, 260/77.5 D
[51] Int. Cl. ....C08g 22/10, C08g 22/14, C08g 22/16
[58] Field of Search .....260/75 TN, 77.5 AM, 77.5 D

[56] References Cited

UNITED STATES PATENTS

| | | |
|---|---|---|
| 3,036,042 | 5/1962 | Schmidt et al...............260/75 |
| 3,541,183 | 11/1970 | Kallert et al...............260/858 |
| 2,729,618 | 1/1956 | Mueller et al. ..............260/75 |
| 2,888,432 | 5/1959 | Fauser......................260/45.4 |
| 2,917,489 | 12/1959 | Gladding et al. .........260/77.5 |
| 2,929,800 | 3/1960 | Hill..............................260/77.5 |
| 2,948,691 | 8/1960 | Windemuth et al. ........260/2.5 |
| 2,953,539 | 9/1960 | Keplinger et al. ........260/31.6 |
| 3,192,185 | 6/1965 | Achterhof et al............260/75 |
| 3,248,373 | 4/1966 | Barringer..................260/77.5 |
| 3,544,524 | 12/1970 | Mueller et al. ...........260/77.5 |

Primary Examiner—Donald E. Czaja
Assistant Examiner—H. S. Cockeram
Attorney—Robert A. Gerlach

[57] ABSTRACT

Polyurethane elastomers are prepared by reacting a prepolymer (A) of a polyether diol and a diisocyanate with a mixture (B) of a polyester diol and a lower molecular weight glycol at a temperature of from about 60°C. to about 180°C. The reaction product of (A) and (B) is resistant to separation and the polyurethane elastomers combine all of the advantageous properties of both polyether polyurethanes and polyester polyurethanes and are useful as foils and coatings and can be molded into a variety of elastomeric products.

6 Claims, No Drawings

SEGMENTED POLYURETHANE ELASTOMERS BASED ON POLYETHER AND POLYESTER DIOLS

This invention relates to elastomeric polyurethanes and more particularly to polyurethane elastomers based on polyether prepolymers in admixture with polyester diols.

The production of polyurethane elastomers by reacting a prepolymer of polyether- or polyester-diols and excess diisocyanate with low molecular weight glycols is well known in the art. Polyurethanes based on polyesters are, however, very liable to hydrolytic decomposition, are easily decomposed by schizomycetes and have a marked tendency to cracking when stretched, especially if, at the same time, they are exposed to moisture. In addition many polyesterpolyurethane elastomers have a marked tendency to crystallization and hardening and have only a very low flexibility at low temperature.

Polyurethane elastomers based on polyether diols which have a good resistance to hydrolysis are, however, more susceptible to the action of hot air and undergo more swelling in organic solvents and in water than polyester polyurethanes and also have less mechanical strength.

Obvious attempts to produce polyurethanes from mixtures of polyethers and polyesters, however, cannot be carried out easily since the diol components usually separate out and it is difficult to find a reproducible method of preparation owing to the varying reactivity of diols.

Subsequent attempts to mix thermoplastically deformable polyurethanes based on polyethers with polyurethanes based on polyesters also give very unsatisfactory results because the polyester urethanes separate from the polyether urethanes in molded products which have been produced in this way, and products made from such mixtures therefore often have severe structural anisotropy.

It is also obvious to assume that mixtures of polyether and polyester urethanes would manifest the undesirable properties both of the pure polyether polyurethanes and of the polyester polyurethanes. In the case of some properties, such as, for example, the resistance to hydrolysis, one would even expect the mixing itself to have an undesirable effect since the hydrophilic polyether constituents could reinforce the transfer of the attacking agent to the sensitive polyester segments.

It is therefore an object of this invention to provide polyurethane elastomers based on polyethers and polyesters devoid of the foregoing disadvantages. It is another object of this invention to provide polyurethane elastomers combining the advantageous properties of both polyether polyurethanes and polyester urethanes. A further object of this invention is to provide polyurethane elastomers having good cold flexibility and high resistance to abrasion and tear propagation. Still another object of this invention is to provide polyurethane elastomers having a high resistance to fats, oils and solvents. Yet another object of this invention is to provide polyurethane elastomers wherein the tendency toward cracking is conspicuously low.

The foregoing objects and others are accomplished in accordance with this invention, generally speaking by providing a polyurethane elastomer which comprises the steps of (A) preparing a polyether prepolymer by reacting about 1 mol of polyether diol having a molecular weight of from about 800 to about 3,500 or a polyether diol mixture with from about 3 to about 20 mols of a diisocyanate at a temperature of from about 60°C. to about 180°C.; (B) preparing a mixture of from about 0.5 to about 2.5 mols of a polyester diol having a molecular weight of from about 800 to about 3,500 and from about 1.5 to about 14.5 mols of a glycol having a molecular weight of less than about 300; and (C) reacting together components A. and B., at a temperature of from about 60°C. to about 180°C., such that the NCO to OH ratio is from about 0.95 to about 1.1.

The process of the invention is surprising in that polyurethane elastomers having very advantageous physical properties can be obtained in a reproducible manner. The process of the invention also has several advantages over heretofore known processes for producing polyurethane elastomers based on mixtures of polyethers and polyesters, such as, for example, eliminating the processing difficulties caused by the tendency of prior art mixtures of polyesters and polyethers to separate into their components; and facilitating dosing and mixing of the components, resulting in a more easily controllable reaction as to component A., since the comparatively inert OH groups preferably present in the polyether diol are reacted with a relatively large excess of isocyanate, and in component B., the concentrations of the highly reactive primary OH groups of the glycol are reduced by dilution with the polyesters.

The present invention thus relates to a process for the production of polyurethane elastomers from diisocyanates, polyether diols having a molecular weight of from about 800 to about 3,500 and polyester diols having a molecular weight of from about 800 to about 3,500 and glycols having a molecular weight below about 300, wherein, in a first reaction stage a prepolymer (A) is prepared from about 1 mol of polyether diol and from about 3 to about 20 mols of diisocyanate at temperatures of from about 60° to about 180°C. and this prepolymer is then reacted in a second reaction stage with (B) a mixture of from about 0.5 to about 2.5 mols of polyester diol and from about 1.5 to about 14.5 mols of glycol at a temperature of from about 60°C. to about 180°C., an overall NCO/OH ratio calculated over both reaction stages of 0.95 to 1.1 being used.

It is not essential that all of the diisocyanate be reacted at once with the polyether diol in the first reaction stage but at least about 2.2 mols of diisocyanate should be used per mol of polyether diol. The quantity of diisocyanate required for the second reaction stage, i.e. sufficient to give an NCO/OH ratio of from about 0.95 to about 1.1, may then be added to the prepolymer before reaction.

The polyurethanes synthesized by the process according to the invention mainly have structural segments represented by formulas (1) and (2):

(1)   —Q—NH—CO—O—A—O—CO—NH—Q—NH—CO—O—E—O—CO—NH—
                                                                                              |
                                                                                              Q
                                                                                              |
       —O—RO[CO—NH—Q—NH—CO—OR—O]$_n$CO—NH (2) 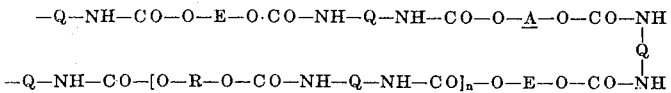

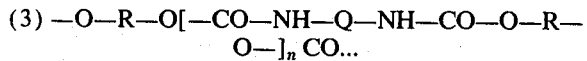

in which

A represents the radical which is obtained by removal of the hydroxyl groups from a dihydroxy polyether, E represents the radical which is obtained by removal of the hydroxyl groups from a dihydroxy polyester, R represents the radical which is obtained by removal of the hydroxyl groups from a glycol, Q represents the radical which is obtained by removal of the isocyanate groups from a diisocyanate and $n$ is a positive integer. These polyurethanes are the so-called block polymers, the "hard segment" of which contains the urethane blocks represented by formula (3):

(3) —O—R—O[—CO—NH—Q—NH—CO—O—R—O—]$_n$ CO...

and "soft segment" or polyester and polyether groups. Since polyethers and polyesters are generally not soluble in each other or are only soluble to a slight extent, the components of this "soft segment" are present entirely or partly in the separated state. This renders the formation of large crystalline regions very difficult, with the result that these polyurethane elastomers are usually distinguished by particularly high transparency and have good flexibility even at low temperatures.

Any polyether polyols may be used for the process according to the invention. Adducts of ethylene oxide or propylene oxide with initiator molecules such as, for example, water, glycol, 1,2-propanediol, 1,3-propanediol, glycerol, trimethylol propane, and the like are particularly suitable. Butylene glycol polyethers and mixed polyethers which in addition to the above mentioned components also have other glycol radicals incorporated in them, such as, for example, phenyl, ethylene glycol radicals and the like are also suitable.

Dihydroxy polyesters are preferably used. Particularly suitable dihydroxy polyesters are polyesters which are obtained from dicarboxylic acids such as, for example, succinic acid, adipic acid, cyclohexane dicarboxylic acid, terephthalic acid, and the like and diols such as, for example, ethylene glycol, 1,2-propylene glycol, 1,3-propylene glycol, 1,4-butanediol, 1,6-hexanediol, and the like. Polycarbonates which have hydroxyl end groups may also be used in the process according to the invention, particularly 1,4-butanediol polycarbonate and 1,6-hexanediol polycarbonate.

Any suitable diisocyanates may be used in the process of the invention, some examples of which are, 2,4-tolylene diisocyanate and mixtures with 2,6-tolylene diisocyanate, 1,6-hexamethylene diisocyanate, 1,4-phenylene diisocyanate, 1,3-phenylene diisocyanate, 4,4'-diisocyanatodiphenylmethane and its mixtures with 2,4-diisocyanato-diphenylmethane, 4,4'-diisocyanato-diphenylpropane, 3,3'-dimethyl-4,4'-diisocyanatodiphenylmethane, 3,3'-dimethoxy-4,4'-diisocyanato-diphenylmethane, 4,4'-diisocyanato-diphenyl, 1,5-diisocyanato-naphthalene and the like.

Any low molecular weight glycol is suitable in the process of the invention. Ethylene glycol, 1,3-propylene glycol, 1,4-butylene glycol, 1,5-pentanediol, 1,6-hexanediol, hydroquinone-bis-hydroxyethyl ether, diethylene glycol, triethylene glycol and the like are given as examples of low molecular weight glycols (molecular weight less than about 300). These alkylene glycols, as the polyesters, should have exclusively primary OH groups.

The preparation of prepolymer (A) from the polyether glycol and the diisocyanate may be carried out continuously or intermittently at temperature of from about 60°C. to about 180°C. In the case of intermittent preparation, the diol is advantageously introduced gradually into the liquid or molten diisocyanate. If the polyether contains secondary OH groups, reaction times of from about 45 to about 120 minutes are required at a preferred reaction temperature of about 100°C. If the highly reactive aromatic diisocyanates are used, it is not necessary to catalyze the reaction. When using the less reactive aliphatic diisocyanates, it is advisable to carry out the reaction at a temperature of about 150°C. or to include known catalysts such as, for example tin dibutyl dilaurate, tin dioctoate, alkali metal salts of carboxylic acid, and the like.

The reaction of polyether prepolymer (A) with the polyester glycol mixture (B) is advantageously carried out at temperatures of from about 60°C. to about 180°C. Since the reaction proceeds rapidly and is vigorously exothermic, it may be carried out continuously or intermittently by rapid and intensive mixing of the components and then immediately pouring them into molds heated to from about 80°C. to about 120°C., or on to warm plates or the like. The reaction mixture solidifies within a few minutes and forms high grade elastomers. Finished products, foils and plates can be produced directly in this way. The elastomers obtained may, if desired, be first broken up into small pieces and then shaped thermoplastically, such as, for example by extrusion, injection molding or calendering. They are soluble in strongly polar solvents such as dimethyl formamide or mixtures of dimethyl formamide and cyclohexanone. Such solutions can be worked up in known manner into foils, coatings and the like.

When using NCO/OH ratios of from about 0.95 to about 1.0, types of urethane rubbers are obtained which can be worked up by known methods used in the rubber industry.

The products of the process are therefore useful for the production of tubes, cable sheathings, buffers, protective flaps, friction bearings, damping transmission elements, shoesoles, textile coatings and the like.

The invention is further illustrated but it is not intended that it be limited by the following Examples in which all parts and percentages are by weight unless otherwise specified.

EXAMPLE 1a

About 100 parts of a mixture (OH number 92, average molecular weight 1,220) of a linear polypropylene glycol ether of molecular weight 2,000 and a linear polypropylene glycol ether of molecular weight 890 are heated to about 100°C. and introduced into about 119.5 parts of 4,4'-diisocyanato-diphenylmethane heated to about 60°C. and the reactants are mixed. The reaction temperature rises to about 120°C. The reaction mixture is stirred at this temperature for about one hour. At the end of this time, the temperature is raised to about 135°C. and the prepolymer is vigorously stirred with a mixture, which is heated to 120°C. of about 100 parts of a polyester of adipic acid and butane-1,4-diol (molecular weight 2,200, OH number 51.4) and about 30 parts of butane-1,4-diol for about 30 seconds and then poured into molds which are at a temperature of about 110°C. to 120°C. The reaction mixture solidifies within a short time and is removed from the mold after about 5 to 10 minutes.

A part of the cooled molded product is granulated with an impeller breaker and worked up in injection molding and extrusion machines. The finished articles have excellent transparency and good mechanical strength.

1b Test for Comparison with 1a:

A polyether, a polyester and a butylene glycol of the same type and in the same proportions as in Example 1a are mixed, heated to about 120°C. and stirred together for about 30 seconds with 4,4'-diisocyanato-diphenylmethane which is heated to about 120°C. The mixture is poured into molds which are at a temperature of about 120°C. The products solidify to a waxy consistency and have little mechanical strength.

1c Test for Comparison with 1a:

About 100 parts of the polyester of Example 1a is heated to about 100°C. and introduced into about 119.5 parts of 4,4'-diisocyanatodiphenylmethane which is heated to about 60°C., and the mixture is stirred. The temperature rapidly rises to about 132°C. The prepolymer is heated to about 135°C. and a mixture of about 100 parts of the polypropylene glycol ether mixture from Example 1a and about 30 parts of butane-1,4-diol which is at a temperature of about 120°C. are stirred together for about 30 seconds and the mixture is poured into molds which are at a temperature of about 110° to 120°C. Subsequent working up is carried out as in Example 1a. The products are semi-opaque and have little mechanical strength.

The results of the physical testing of the products prepared according to Examples 1a to 1c are summarized in Table 1.

with a mixture which is heated to about 100°C. of about 45 parts of butane-1,4-diol and about 100 parts of a polyester of adipic acid and ethanediol (OH number 112, molecular weight 1,000), and poured on to plates which are at a temperature of about 120°C. The reaction product may be lifted off after about 5 minutes. When cold, the product is granulated and worked up into test samples in injection molding machines.

2b Test for Comparison with 2a:

The procedure is the same as in Example 2a but about 100 parts of the polyester are replaced by the equivalent quantity of a propylene glycol ether (OH number 110). Only a waxy mass is obtained, the mechanical properties of which could not be tested.

2c Test for Comparison with 2a:

About 100 parts of polypropylene glycol ether (molecular weight 2,000, OH number 56) and about 100 parts of polypropylene glycol ether (molecular weight 1,020, OH number 110) are reacted with about 173 parts of 4,4'-diisocyanato-diphenylmethane at about 120°C. and the reaction mixture is heated at about 120°C. for about 65 minutes and then immediately mixed with about 45 parts of butane-1,4-diol. The product is poured on to plates which are at a temperature of about 120°C. After about 10 minutes, it is lifted off, cooled, granulated and molded.

2d Test for Comparison with 2a:

The procedure is the same as in Example 2a but instead of polypropylene glycol polyether, a polyester of adipic acid and ethylene glycol (molecular weight 2,000, OH number 56, acid number 0.9) is used. The values obtained are shown in the table below:

|  | Test According to DIN | Dimension | Example 2a | 2b | 2c | 2d |
|---|---|---|---|---|---|---|
| Shore hardness | 53 505 | A | 97 96 | — | 95 |  |
| Tensile strength | 53 504 | kg wt/cm² | 492 410 | — | 268 |  |
| Elongation at break | 53 504 | % | 510 480 | — | 141 |  |
| Loss by abrasion | 53 516 | mm³ | 39 33 | — | 104 |  |

Additional tests:

Test samples from Examples 2a to 2d were stored in

TABLE 1

| Properties tested | Examination according to DIN | Dimension | Example 1a | 1b | 1c |
|---|---|---|---|---|---|
| Appearance | | | Transparent | Waxy, opaque | Opaque |
| Shore hardness A | 53,505 | | 88 | 86 | 84 |
| Tensile strength | 53,504 | Kg. wt./cm.² | 392 | 210 | 192 |
| Tear propagation resistance | 53,515 | Kg. wt./cm. | 69 | 34 | 20–40 |
| Loss by abrasion | 53,516 | mm.³ | 38 | 140 | 94 |

EXAMPLE 2a

About 100 parts of a polypropylene glycol ether (molecular weight 2,000, OH number 56) is heated to about 100°C. and reacted with about 173 parts of 4,4'-diisocyanato-diphenylmethane which is heated to about 50°C. After about one hour of stirring at about 110°C., the prepolymer is intensively stirred together water at about 100°C. and the time for the tensile strength to drop to about 200 kg wt/cm² was determined:

|  | 2a | 2b | 2c | 2d |
|---|---|---|---|---|
| t (days) = | 10–11 | — | 4–5 | 3–4 |

Test samples from Examples 2a to 2d were buried under a pretension of about 50 percent in moist garden soil. After about 3 months, the attack by schizomycetes and formation of cracking were determined. The samples from experiments 2a and 2c show no damage but the samples from experiments 2d are attacked by schizomycetes and show cracks transverse to the direction of stretching. Sample 2b is broken right through but shows no attack by mold.

EXAMPLE 3

A mixture of about 33.8 parts of a linear polypropylene glycol ether of molecular weight 2000 and about 14.7 parts of a trifunctional polypropylene glycol ether of molecular weight 2,000 are stirred for about one hour at about 140°C. with about 24 parts of hexamethylene-1,6-diisocyanate. The prepolymer produced is treated with about 1 part of 2, 6-2', 6'-tetraisopropyl-diphenylcarbodiimide and stirred together for about 120 seconds with a solution which is heated to about 120°C. of about 0.01 part of sodium acetate in about 8 parts of butane -1,4-diol and about 46.5 parts of a hexanediol polycarbonate (molecular weight 2,000) which have terminal hydroxyl groups. The mixture is then poured out on plates which are at a temperature of about 110°C. The product may be stripped from a plate after about 8 minutes. The following mechanical properties are determined on the elastic transparent synthetic material:

| | |
|---|---|
| Tensile strength (kg wt/cm²; DIN 53 504): | 248 |
| Elongation at break (%; DIN 53 504): | 560 |
| Tear propagation resistance (kg wt/cm; DIN 53 515): | 58 |
| Shore hardness A (DIN 53 505) | 81 |

EXAMPLE 4

The same procedure was employed as in Example 3 but about 18.2 parts of the linear polypropylene glycol ether (molecular weight 2,000), about 19.2 parts of the trifunctional polypropylene glycol ether (molecular weight 2,000) and about 62.6 parts by weight of the hexanediol polycarbonate are used. The elastic, transparent material is granulated and extruded into bands which are about 2 mm in thickness and about 32 mm in width. The properties of these bands are tested as follows:

| | |
|---|---|
| Tensile strength (kg wt/cm²; DIN 53 504): | 220 |
| Elongation at break (%; DIN 53 504): | 400 |
| Tear propagation resistance (kg wt/cm; DIN 53 515): | 50 |
| Shore hardness A (DIN 53 505): | 85 |

The test samples from Examples 3 and 4 were stored in water at about 100°C. for about 7 days. The mechanical properties were unchanged at the end of this time.

EXAMPLE 5

A prepolymer of about 43 parts of a linear polypropylene glycol ether of molecular weight 2,000 and about 35.6 parts of 4,4'-diisocyanato-diphenyl-methane is prepared at about 120°C., stirred at about 20 mm Hg for about 30 minutes and treated with about 1 part of 2,2', 6,6'-tetraisopropyl-diphenylcarbodiimide. The propolymer at a temperature of about 125°C. is then stirred for about 45 seconds with a mixture which is heated to about 125°C. of about 8 parts of butane-1,4-diol and about 57 parts of a polyester of adipic acid, butanediol and ethane diol (molecular weight 2,000, OH number 56). Plates 1, 2, 4 and 6 mm in thickness are cast in the course of about 1 minute (molding temperature 120°C.). They may be stripped after about 10 minutes. The test samples were stored at about 90°C. for about 15 hours and then tested.

| | |
|---|---|
| Tensile strength (kg wt/cm²; DIN 53 504): | 281 |
| Elongation at break (%; DIN 53 504): | 480 |
| Tear propagation resistance (kg wt/cm; DIN 53 515): | 48 |
| Shore hardness (DIN 53 504): | 76 |

In the soil corrosion test, i.e. storage in moist garden soil under a pretension of 50 percent, the test samples show no damage by schizomycetes after about 6 weeks, whereas the control sample, an elastomer which is prepared in a similar manner exclusively from the polyester of adipic acid, butanediol and ethanediol (molecular weight 2,000), butane-1,4-diol and 4,4'-diisocyanato-diphenylmethane was strongly attacked by schizomycetes and damaged by crack formation.

EXAMPLE 6

Example 5 is repeated, but instead of about 35.6 parts of 4,4'-diisocyanato-diphenylmethane (NCO/OH = 1.03), only about 34.8 parts (NCO/OH = 0.97) are used. The molded products are granulated, and about a 20 percent solution in dimethyl formamide is prepared by dissolving the granules at about 90°C. After painting the solution on glass plates and drying, very thin flexible and very stretchable films are obtained which are insoluble in trichloroethylene, petroleum hydrocarbons and oil.

Although the invention has been illustrated in considerable detail by the foregoing it is to be understood that such detail is solely for the purpose of illustration and that one skilled in the art may make many variations therein without departing from the spirit and scope of the invention.

What is claimed is:

1. A polyurethane elastomer prepared by a process which comprises preparing, in a first reaction stage a prepolymer (A) of 1 mol of a polyether diol having a molecular weight of from about 800 to about 3,500 and from about 3 to about 20 mols of a diisocyanate at a temperature of from about 60°C. to about 180°C. and reacting (A) in a second reaction stage with a mixture (B) of from about 0.5 to 2.5 mols of a polyester diol, having a molecular weight of from about 800 to about 3,500, and a glycol having a molecular weight of less than about 300, at a temperature of from about 60°C. to about 180°C., such that an NCO to OH ratio of from about 0.95 to about 1.1 ratio calculated over both reaction stages is used.

2. The elastomer of claim 1 wherein the diisocyanate is 4,4'-diisocyanato diphenylmethane.

3. The elastomer of claim 1 wherein the polyether diol is a polypropylene glycol ether or a mixture of polypropylene glycol ethers.

4. The elastomer of claim 1 wherein the mixture (B) is a mixture of a polyester of adipic acid and butane-1,4-diol.

5. The elastomer of claim 1 wherein the polyester diol is a hexanediol polycarbonate.

6. The elastomer of claim 1 wherein the glycol is butane-1,4-diol.

* * * * *